(12) United States Patent
De Anna et al.

(10) Patent No.: US 8,514,528 B2
(45) Date of Patent: Aug. 20, 2013

(54) METHOD OF PROTECTION FROM OVER-TEMPERATURE AND CORRESPONDING ARRANGEMENT

(75) Inventors: Paolo De Anna, Vallà di Riese Pio X (IT); Francesco Martini, Padua (IT)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 447 days.

(21) Appl. No.: 12/919,767

(22) PCT Filed: Feb. 27, 2008

(86) PCT No.: PCT/IB2008/000592
§ 371 (c)(1),
(2), (4) Date: Aug. 27, 2010

(87) PCT Pub. No.: WO2009/106911
PCT Pub. Date: Sep. 3, 2009

(65) Prior Publication Data
US 2011/0002070 A1 Jan. 6, 2011

(51) Int. Cl.
*H02H 5/04* (2006.01)
(52) U.S. Cl.
USPC .......................................................... 361/37
(58) Field of Classification Search
USPC .......................................................... 361/37
See application file for complete search history.

(56) References Cited

U.S. PATENT DOCUMENTS

| | | | |
|---|---|---|---|
| 5,321,572 A | 6/1994 | Shibui et al. | |
| 5,687,066 A | 11/1997 | Cook, II | |
| 6,078,511 A | 6/2000 | Fasullo et al. | |
| 6,449,178 B1 * | 9/2002 | Sakai et al. | 363/131 |
| 7,149,098 B1 | 12/2006 | Chen | |
| 7,566,845 B2 * | 7/2009 | Usui et al. | 219/481 |
| 2002/0089085 A1 * | 7/2002 | Kim | 264/272.18 |
| 2003/0201868 A1 | 10/2003 | McMichael et al. | |
| 2005/0141161 A1 | 6/2005 | Usui | |
| 2006/0056205 A1 | 3/2006 | Kyono | |
| 2007/0139837 A1 | 6/2007 | Usui et al. | |

FOREIGN PATENT DOCUMENTS

| | | |
|---|---|---|
| CN | 2252452 Y | 4/1997 |
| CN | 1296167 A | 5/2001 |
| CN | 2612982 Y | 4/2004 |
| EP | 0041288 A1 | 12/1981 |
| EP | 1933439 A1 | 6/2008 |
| FR | 2742598 A3 | 6/1997 |
| GB | 1195699 A | 6/1970 |
| JP | 60134408 A | 7/1985 |
| JP | 1122367 A | 5/1989 |
| WO | 2007032489 A1 | 3/2007 |

OTHER PUBLICATIONS

English Abstract of CN1296167 A. May 23, 2001.
English Abstract of CN2252452 Y. Apr. 16, 1997.

(Continued)

*Primary Examiner* — Rexford Barnie
*Assistant Examiner* — Tien Mai

(57) ABSTRACT

A method of protecting from over-temperature a device associated with an electronic converter including a feedback path for regulating the output signal of said electronic converter may include providing a thermal sensitive component sensitive to the temperature of said device, and including said thermal sensitive component in said feedback path of said electronic converter, whereby said output signal of said electronic converter is reduced as a function of the temperature of said device as sensed by said thermal sensitive component.

15 Claims, 2 Drawing Sheets

(56) References Cited

OTHER PUBLICATIONS

Figure 1:
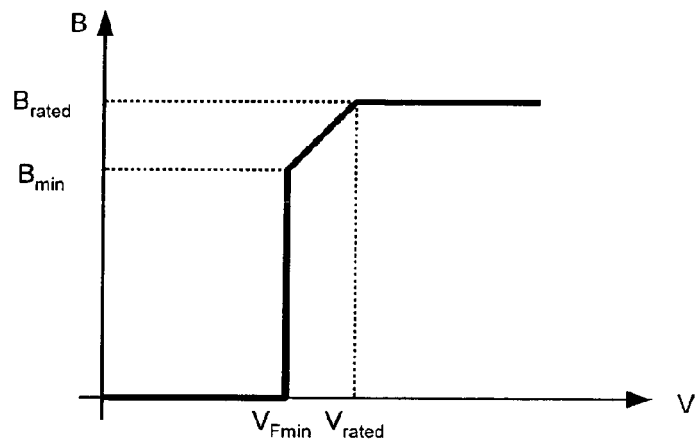

English Abstract of CN2612982 Y. Apr. 21, 2004.
The International Search Report of corresponding PCT/IB2008/000592 mailed on Aug. 19, 2009.

Abstract for FR 2742598 (A3), Jun. 17. 1997.
Abstract for JP 60134408 (A), Jul. 17, 1985.
Abstract for JP 1122367 (A), May 15, 1989.

* cited by examiner

METHOD OF PROTECTION FROM OVER-TEMPERATURE AND CORRESPONDING ARRANGEMENT

RELATED APPLICATIONS

The present application is a national stage entry according to 35 U.S.C. §371 of PCT application No.: PCT/IB2008/000592 filed on Feb. 27, 2008.

TECHNICAL FIELD

This disclosure relates to techniques for protecting electrical/electronic devices from over-temperature.

This disclosure was developed with specific attention paid to its possible use in protecting from over-temperature a device associated with a DC power converter. An exemplary field of use of the disclosure is thermal protection of safety insulating transformers in off-line DC power converter designed e.g. to supply modules including Light Emitting Diodes (LEDs) with a constant voltage output, such as a Safety Extra Low Voltage (SELV).

Reference to this possible field of application is not however to be construed in a limiting sense of the scope of the invention.

BACKGROUND

LED modules used e.g. as lighting sources may be supplied by a constant voltage source via a linear regulator, which regulates the current flow through the LED or LEDs and adapts the source voltage to actual LED voltage drop. This depends on the technology and operating conditions such as ambient temperature, direct current, and thermal dissipation conditions. Using an electronic converter for supplying these modules with a constant voltage (in the place of a constant current) and the presence of a linear regulator "on board" the module itself may be useful for different reasons which are per se well known in the prior art.

SUMMARY

In order to allow a maximization of the output power, while guaranteeing always the safety of the device, such electronic power converters should be protected from over-temperature.

Various embodiments provide a cheap and integrated way of providing such a protection.

The claims are an integral part of the disclosure of the invention provided herein.

In an embodiment, protection is provided by means of a thermal sensitive component, such as a Positive Temperature Coefficient (PTC) or Negative Temperature Coefficient (NTC) resistor arranged in proximity of the main safety component of the power supply.

In an embodiment, the thermal component is mounted in proximity of the safety insulation transformer of the electronic converter.

In an embodiment, circuitry is provided to reduce the output voltage of the electronic converter if the temperature of the transformer exceeds a first thermal threshold.

In various embodiments, the circuitry is provided in the feedback path of the electronic converter and changes the set-point of the output voltage; in an embodiment, the circuitry guarantees that the rated output voltage remains unchanged if the temperature is below the first thermal threshold and to shut down the electronic converter if the temperature is above a second thermal threshold.

In an embodiment, the thermal sensitive component is arranged in mechanical contact with (e.g. mounted on or integrated in) the protected device (e.g. a transformer). In an embodiment, a "concentric" (one chamber) transformer with one or more windings at the primary side of the converter and one or more windings at the secondary side of the converter is used.

In an embodiment, a bobbin is used which provides enough pins to connect all windings and the terminals of the thermal sensitive component to the PCB.

In an embodiment, a conventional PTC or NTC resistor is used with pin-through-hole (PTH) technology. Surface Mount Device (SMD) components with e.g. hand soldered pins may also be used. The pins of the component are connected to the pins of the bobbin.

In an embodiment, the transformer is provided with one or more external layers, such as layers of tape, which fix the thermal component to the most external winding. Specifically, in an embodiment, two layers are used and the thermal component is inserted between these outer layers, wherein the leads of the component are positioned in direction of the pins of the bobbin. In this case, the leads of the thermal component may be tied and soldered to the pins of the bobbin in order to guarantee the electrical, contact between the component and the conductive (e.g. metal) tracks on the PCB.

The thermal sensitive component may be positioned outside of the loop formed by the main switching net in order to avoid that the information provided by the component is altered due to current induced in the component by the magnetic flux near the transformer. The leads of the thermal component may extend substantially perpendicular to the wires of the windings in order to minimize the magnetic coupling and the energy transfer between them.

BRIEF DESCRIPTION OF THE ANNEXED DRAWINGS

Figure 2:
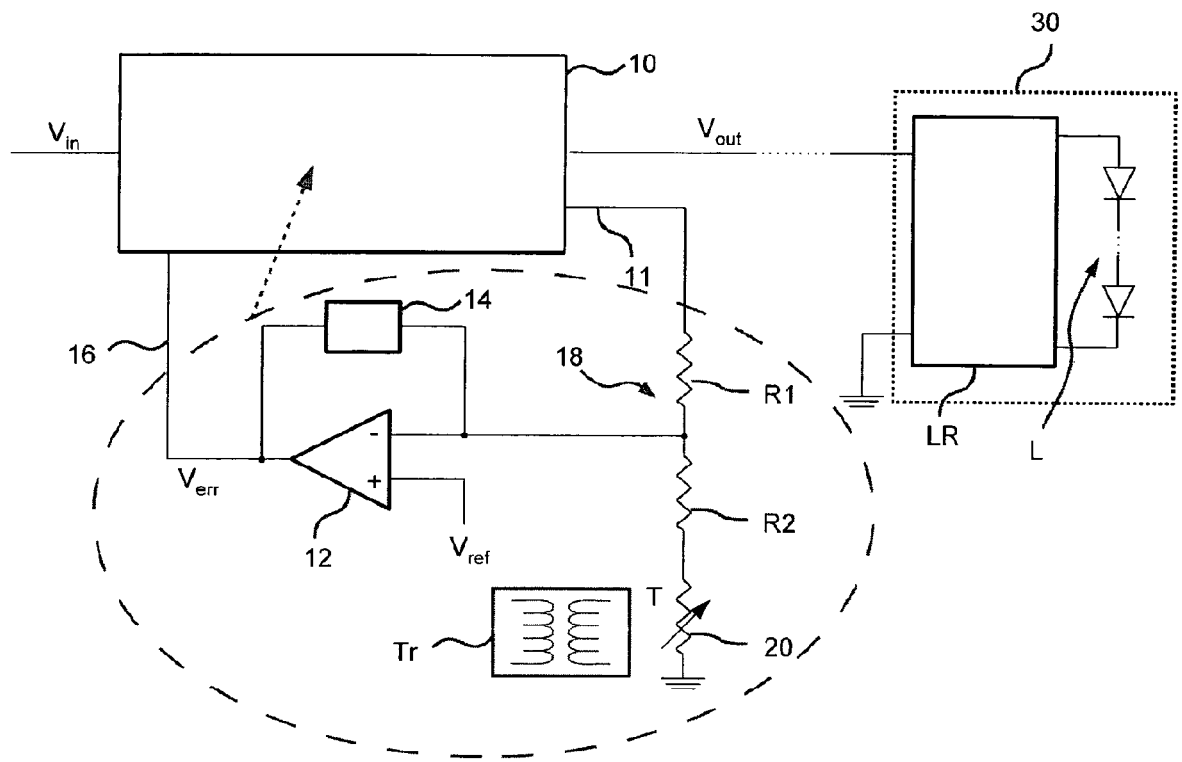
Figure 3:
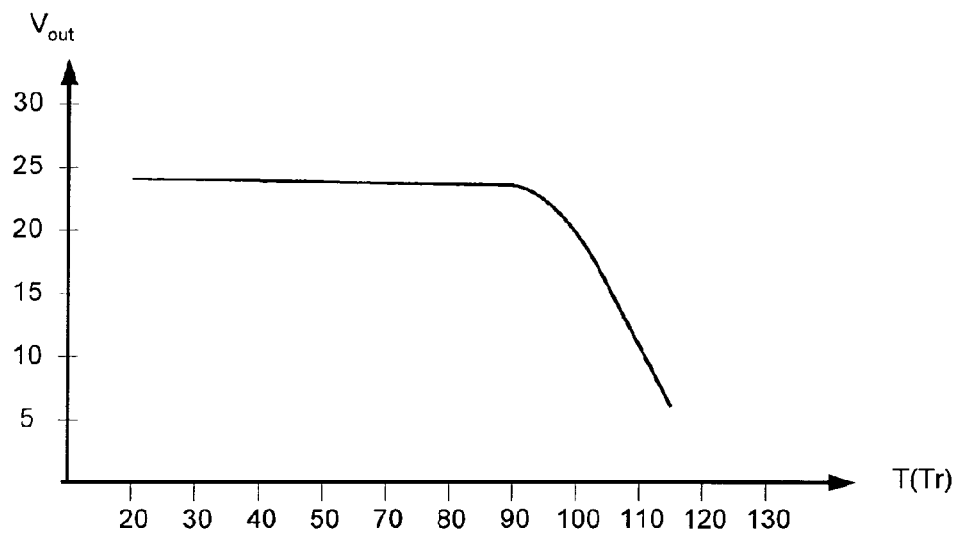
Figure 4:
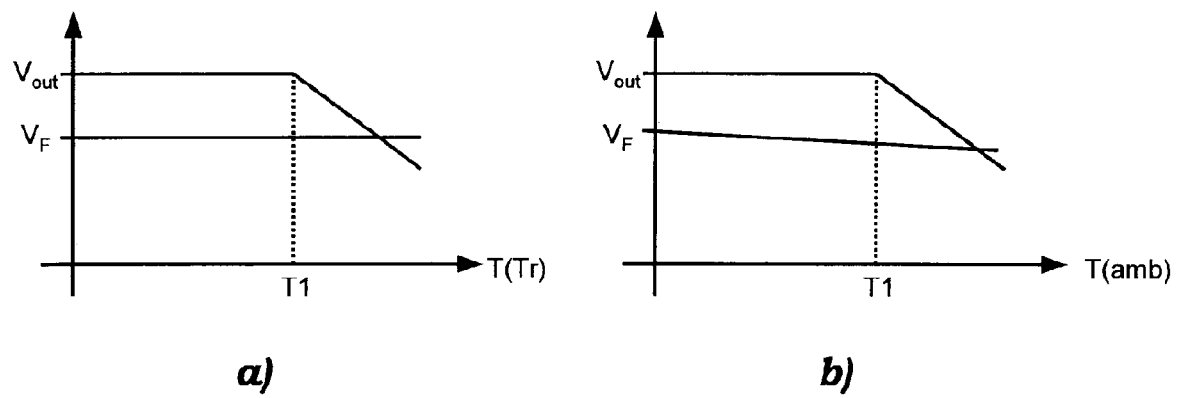

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 is a diagram showing a typical relationship between the input voltage to a LED module and the brightness produced thereby, FIG. 2 is a schematic representation of a circuit for connecting a thermal sensitive component in a feedback path of an electronic converter, FIG. 3 is a diagram representative of regulation of the output voltage in an electronic converter, and FIGS. 4a and 4b show two possible scenarios of operation of the arrangement described herein.

DETAILED DESCRIPTION

The following detailed description refers to the accompanying drawings that show, by way of illustration, specific details and embodiments in which the invention may be practiced.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

FIG. 1 shows the notional relationship between the supply voltage applied to a LED module and the brightness B of the LED or LEDs included therein. Specifically, if the supply voltage is below a minimum forward voltage $V_{Fmin}$, the LED will be switched off. In the region between the minimum voltage $V_{Fmin}$ and a voltage $V_{rated}$, variation of the brightness B of the LED may be noticeable in a range from $B_{min}$ to $B_{rated}$. If the supply voltage is above a voltage $V_{rated}$, the brightness of the LED will be almost constant, thanks to the "on board" regulator of the LED module.

An aspect of this disclosure is based on the recognition that the presence of an almost constant voltage at the input of a LED module is not a necessary condition in order to guarantee the correct operation of the LED or LEDs therein. For example, a LED module may continue to operate even if the voltage supplied thereto is lower (or higher) than the specified forward voltage $V_{rated}$ of the LED-modules. The inventors have thus noted that the operating thermal range of a LED module can be maximized by decreasing the power delivered over a certain temperature range without affecting significantly the output light of the LED module.

To that effect, an embodiment of this disclosure relates to a thermal sensitive component, such as a PTC, mounted on a printed circuit board (PCB) in close proximity of the insulating transformer. Preferably the component is glued to the transformer. In an embodiment, a PTC is mounted at the primary side of the transformer in compliance with the applicable safety requirements; the PTC is electrically insulated from the secondary winding of the transformer.

Generally a PTC has a low resistance value up to a certain threshold temperature, and above this temperature the resistance value increases exponentially with temperature. The specific electrical and thermal characteristics of the PTC used are chosen (in manner known per se) in accordance with the thermal class of the transformer.

FIG. 2 shows a possible embodiment of circuitry for connecting a thermal sensitive component 20, such as a PTC, in the feedback path of an insulated electronic converter 10 having an input voltage $V_{in}$ and an output voltage $V_{out}$ to be fed to a LED module 30.

In an embodiment of this disclosure, the transformer Tr and the related circuitry in the feedback path as described in detail herein are included in the converter 10: nonetheless in FIG. 2, these elements are shown externally of the converter 10 for ease of representation.

In the embodiment shown, the input voltage is derived from the mains (e.g. 240V-50 Hz) and the output voltage is applied to a LED module 30 comprised of a linear regulator LR that feeds one of more LEDs designated L as a whole.

A signal representative of the value of $V_{out}$ is present on an output pin 11 of the converter 10 (or can be derived directly from the output of the converter 10).

The signal representative of the value of $V_{out}$ may be scaled down by a resistive voltage divider 18 and fed to one of the inputs of an error amplifier 12 to be compared with a reference voltage signal $V_{ref}$. In the embodiment shown, the error amplifier 12 has an associated (negative) feedback loop including regulation circuitry 14 to produce (in a manner known per se) an error signal $V_{err}$. The error signal $V_{err}$ is then sent over a line 16 as a voltage error input to the switching modulator of the electronic converter 10.

The resistive voltage divider 18 includes a thermal sensitive component 20 such as a PTC. In the following it will be assumed that the thermal sensitive component 20 is arranged in close proximity or mechanical contact with the insulating transformer (schematically indicated Tr in the drawing) associated to the converter 10. In an embodiment, the PTC 20 is mounted at the primary side of the transformer Tr.

In an embodiment, the voltage divider 18 includes:
an "upper" branch including a resistor R1, and
a "lower" branch including the thermal sensitive component 20 and, preferably, a resistor R2 connected in series with the thermal sensitive component 20 (which for the time being will be considered to be a PTC, namely a resistor whose resistance value increases with temperature).

In such an embodiment, when and as long as the temperature T of the insulating transformer Tr is below the temperature threshold of the PTC, the scaling ratio of the voltage divider 18 is essentially constant, because small variations of the resistance of the PTC have only a small influence on the divided output signal.

When the temperature of the transformer exceeds a temperature threshold of the PTC, the resistance value of the PTC will increase exponentially and the output voltage of the voltage divider will increase.

In the embodiment illustrated in FIG. 2, the divided output voltage is connected to the inverting (negative) input of the error amplifier 12 and the reference signal $V_{ref}$ is connected to the non-inverting (positive) input.

Therefore, if the transformer temperature increases, the feedback regulator will find a new working point which will in turn reduce the output voltage $V_{out}$ of the electronic converter 10.

FIG. 3 shows in that respect a typical relationship between the output voltage $V_{out}$ and the transformer temperature T(Tr), wherein the temperature threshold of the PTC has been selected to be approximately 90° C.

A NTC resistor may be used as the thermal sensitive component 20 in the voltage divider, by possibly modifying the voltage divider and the connection to the error amplifier 12 as required to ensure the desired operation.

In an embodiment, the protection effect may be improved by adding a second threshold to limit the minimum output voltage of the converter. For example, the same voltage which is compared with the reference signal $V_{ref}$ may be connected to a voltage comparator (not shown), which is able to shut down the converter.

In an embodiment, the error amplifier and the optional comparator form part of the integrated circuit of the switching power supply.

FIGS. 4a and 4b show a further advantageous behaviour of the arrangements of this disclosure.

Specifically, FIG. 4a shows a diagram wherein the forward voltage of the LEDs remains essentially constant, which is typically the case when the temperature of the LEDs remains constant. In this case, when the temperature T of the transformer Tr denoted T(Tr) exceeds a temperature threshold T1 of the thermal sensitive component, the output voltage of the electronic converter will decrease as explained in the foregoing. As soon as the output voltage $V_{out}$ falls below the forward voltage $V_F$ of the LEDs, the LEDs will be switched off and consequently the current flow through the electronic converter will be reduced drastically. This behaviour is particularly advantageous in protecting the electronic converter from an overload or short circuit at the output.

FIG. 4b shows a diagram wherein the forward voltage of the LEDs decreases. This is typically the case when the transformer temperature increases due to a rise of the ambient temperature T(amb), which influences also the performance and the electrical characteristics of the LEDs. In fact, the voltage drop at the LEDs typically decreases when their temperature increases. This behaviour may be advantageously used to increase the temperature range of the system, because the temperature at which the output voltage $V_{out}$ falls below the forward voltage $V_F$ of the LEDs is moved to a higher temperature.

In order to improve the mechanical contact and the heat transfer between the transformer and the thermal sensitive component 20, the component may be integrated in the transformer. Such an arrangement may be advantageous in terms of cost reduction, because no complex and expansive manual operations, such as positioning and fixing (e.g. gluing) of the thermal component, are necessary.

In an embodiment, a "concentric" (one chamber) transformer with one or more windings at the primary side of the converter and one or more windings at the secondary side of the converter may be used. For example the secondary winding may be realised with triple-insulation special wire (TEX-E), which guarantees a reinforced insulation between the primary and secondary side according to well known safety application standards.

In an embodiment, a bobbin is used which provides enough pins to connect all windings and the terminals of the thermal sensitive component to the PCB.

In an embodiment, the leads of the component may be connected to the pins of the bobbin. A conventional PTC or NTC resistor with pin-through-hole (PTH) technology may be used. Surface Mount Device (SMD) components with e.g. hand soldered pins may also be used.

For example, the transformer may be provided with one or more external layers, such as layers of tape, which fix the thermal component to the most external winding. Specifically, at least two outer layers may be used, wherein the thermal component is inserted between these outer layers and wherein the leads of the component are positioned in direction of the pins of the bobbin. In this case, the leads of the thermal component may be tied and soldered to the pins of the bobbin in order to guarantee the electrical contact between the component and the conductive (e.g. metal) tracks on the PCB.

In an embodiment, the thermal sensitive component is positioned outside of the loop formed by the main switching net in order to avoid that the information provided by the component is altered due to current induced in the component by the magnetic flux near the transformer.

In an embodiment, the leads of the thermal component are substantially perpendicular to the wires of the windings in order to minimize the magnetic coupling and the energy transfer between them.

In an embodiment, an EF16 horizontal bobbin transformer is used. This arrangement includes by a primary winding (CuL wire), an insulating tape layer, a secondary winding (TEX-E triple insulated wire) and an external or outer tape layer. Such a construction guarantees the insulating distance between the secondary terminals and the circuitry on the primary side. In this case, the thermal sensitive component is fixed in strict contact with the inner layers of wire and tape by means of a further external tape layer, wherein the leads of the component are kept as perpendicular as possible to the wires of the windings. Then the leads of the thermal component are soldered to two free pins of the bobbin to guarantee the electrical contact.

Without prejudice to the underlying principles of the invention, the details and the embodiments may vary, even appreciably, with reference to what has been described by way of example only, without departing from the scope of the invention as defined by the annexed claims.

The invention claimed is:

1. A method of protecting from over-temperature a device associated with an electronic converter including a feedback path for regulating the output signal of said electronic converter, the method comprising:
providing a thermal sensitive component sensitive to the temperature of said device,
including said thermal sensitive component in said feedback path of said electronic converter, whereby said output signal of said electronic converter is reduced as a function of the temperature of said device as sensed by said thermal sensitive component,
including in said feedback path of said electronic converter a voltage divider to produce a feedback signal indicative of said output signal of said electronic converter,
including said thermal sensitive component in said voltage divider, and
further including an error amplifier in said feedback path of said electronic converter for comparing the signal divided out of said voltage divider with a reference signal, said error amplifier being configured to generate an error signal used to regulate said electronic converter.

2. The method of claim 1, further comprising:
shutting down said electronic converter if the temperature of said device reaches an upper temperature threshold.

3. The method of claim 1,
wherein including said thermal sensitive component in said feedback path of said electronic converter comprises:
including in said feedback path of said electronic converter a voltage divider to produce a feedback signal indicative of said output signal of said electronic converter, and
including said thermal sensitive component in said voltage divider.

4. The method of claim 1, further comprising:
arranging said thermal sensitive component in mechanical contact with said device to be protected.

5. An arrangement for protecting from over-temperature a device associated with an electronic converter including a feedback path for regulating the output signal of said electronic converter, the arrangement comprising:
a thermal sensitive component sensitive to the temperature of said device, said thermal sensitive component being included in said feedback path of said electronic converter to reduce said output signal of said electronic converter as a function of the temperature of said device as sensed by said thermal sensitive component,
wherein said feedback path of said electronic converter includes a voltage divider to produce a feedback signal indicative of said output signal of said electronic converter,
wherein said thermal sensitive component is included in said voltage divider, and
wherein said feedback path of said electronic converter further includes an error amplifier for comparing the signal divided out of said voltage divider with a reference signal, said error amplifier being configured to generate an error signal used to regulate said electronic converter.

6. The arrangement of claim 5,
wherein said thermal sensitive component is a component sensitive to temperature above a first temperature threshold, whereby said output signal remains substantially constant if the temperature of said device is lower than said first temperature threshold.

7. The arrangement of claim 5,
wherein a resistor is connected in series with said thermal sensitive component.

8. The arrangement of claim 5,
wherein said electronic converter includes a thermal shutdown feature for shutting down said electronic converter if temperature increases beyond a predetermined threshold.

9. The arrangement of claim 5,
wherein said thermal sensitive component is arranged in mechanical contact with said device.

10. The arrangement of claim 5,
wherein the error amplifier is configured to generate the error signal used to regulate said electronic converter by sending said error signal to a switching modulator in said electronic converter.

11. The arrangement of claim 5,
wherein said device is a transformer.

12. The arrangement of claim 11,
wherein said transformer is a concentric transformer with one or more windings at the primary side of the converter and one or more windings at the secondary side of the converter, and wherein said thermal sensitive component is mounted in the vicinity of said transformer.

13. The arrangement of claim 11,
wherein the leads of said thermal sensitive component are substantially perpendicular to the wires of the windings of said transformer.

14. The arrangement of claim 11,
wherein said transformer includes one or more outer layers for fixing the thermal sensitive component to the most external winding of said transformer.

15. The arrangement of claim 14,
wherein said one or more outer layers comprises one or more layers of tape for fixing the thermal sensitive component to the most external winding of said transformer.

\* \* \* \* \*